United States Patent [19] [11] Patent Number: 4,686,347
Arakawa et al. [45] Date of Patent: Aug. 11, 1987

[54] METHOD FOR WELDING AMORPHOUS WOUND CORES

[75] Inventors: Shunsuke Arakawa; Kunio Shitori, both of Saitama, Japan

[73] Assignee: Hitachi Metals, Ltd., Osaka, Japan

[21] Appl. No.: 698,390

[22] Filed: Feb. 5, 1985

[30] Foreign Application Priority Data

Feb. 15, 1984 [JP] Japan .................. 59-26641

[51] Int. Cl.⁴ ............................. B23K 11/16
[52] U.S. Cl. ................. 219/117.1; 219/91.2; 219/118
[58] Field of Search ............ 219/117.1, 118, 86.1, 219/91.2; 336/213; 29/605-606

[56] References Cited

U.S. PATENT DOCUMENTS 3,242,306 3/1966 Dallas et al. .............. 219/91.2
3,439,606 4/1969 Bursik et al. ................ 219/89
4,115,682 9/1978 Kavesh et al. .............. 219/118

FOREIGN PATENT DOCUMENTS 105486 10/1938 Australia ................ 336/213
29925 6/1981 Japan ..................... 219/91.2

Primary Examiner—E. A. Goldberg
Assistant Examiner—C. M. Sigda
Attorney, Agent, or Firm—Birch, Stewart, Kolasch & Birch

[57] ABSTRACT

A method for welding a wound core constituted by an amorphous ribbon which comprises the steps of bringing a pair of electrodes into contact with the surface of the outer end portion of the ribbon, and supplying an electric pulse to the pair of electrodes to instantaneously melt the above outer end portion and the underlying ribbon layer thereby welding them together without causing deterioration in the magnetic characteristics thereof.

4 Claims, 2 Drawing Figures

METHOD FOR WELDING AMORPHOUS WOUND CORES

BACKGROUND OF THE INVENTION

1. Field of the Invention

The present invention relates to a method of welding wound cores of substantially amorphous ribbons and a wound core made thereby.

2. Description of the Prior Art

Wound cores of amorphous alloy ribbons made by rapid quenching have increasingly been used for varieties of applications, among other things, choke coils, filters, saturable reactors, etc.

Amorphous wound cores are in general heat-treated and encased in nonmagnetic cases usually made of plastics. Alternatively, they may be impregrated with resins. Since they are constituted by ribbons, however, they tend to loosen and the ribbon ends are likely to be separated from the wound core bodies, unless the ribbon ends are fastened to the core bodies. Accordingly, some measures should be taken to prevent the above problems from occurring until the wound cores are contained in cases or impregnated with resins.

Japanese Patent Laid-Open No. 53-65238 discloses a process for welding at least two glassy metal bodies by clamping overlapped portions of the bodies between electrodes and applying a clamping force to the overlapped portions, supplying an electrical current having a rapid decay to the electrodes to melt metal body portions through which the current passes, and extracting heat from the bodies through the electrodes to cool the bodies at a rate of at least $10^5$ °C./sec by employing high conductivity electrodes. Thanks to quick removal of heat generated by welding, welds are kept substantially glassy. In this process, however, a clamping force is applied to the wound ribbons so that internal stress remains in the welds. This deteriorates magnetic properties of the wound cores. In particular, the coercivity of the wound cores increases due to the internal stress remaining therein. The larger the coercivity of wound cores, the more the loss thereof when used. Furthermore, when three or more ribbon layers are to be welded, this method does not work well due to large contact resistance between the ribbons clamped between the two electrodes. Accordingly, this process is not considered effective for welding wound cores of many turns.

The use of laser ray has been proposed to weld laminated amorphous alloy sheets constituting magnetic head core chips. Welding is performed on the periphery of the laminated sheets. This may be suitable for welding the sheets laminated into integral bodies like magnetic core chips. It is, however, not necessarily suitable for welding amorphous wound cores which should have as small welded areas as possible. Further, wound cores need not be welded from the outermost ribbons to the innermost ribbons. Accordingly, it may be said that the laser welding method unnecessarily causes too much deterioration of magnetic characteristics. In addition, the laser welding method is generally expensive and should be performed carefully so as to avoid dangerous accidents.

An object of the present invention is, therefore, to provide a method for welding amorphous wound cores economically without deteriorating the magnetic characteristics thereof.

SUMMARY OF THE INVENTION

A method for welding a wound core constituted by an amorphous ribbon according to the present invention comprises the steps of contacting a pair of electrodes with the surface of the outer end portion of the ribbon, and supplying an electric pulse to the pair of electrodes to instantaneously melt the above outer end portion and the underlying ribbon layer thereby welding them together.

DESCRIPTION OF THE PREFERRED EMBODIMENTS

Figure 1:
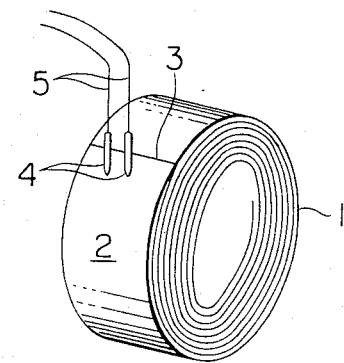
FIG. 1 is a schematic view of an amorphous wound core being welded with a pair of electrodes.

The welding of the present invention is applicable to any amorphous wound core. The amorphous wound core is generally manufactured by winding an amorphous ribbon in a toroidal shape. The ribbon may be made of any amorphous alloys including CoFeSiB, FeNiSiB, FeSiB, NiSiB, FeNiPC, CoZr, etc. The ribbon's thickness may vary depending on the applications of amorphous wound cores, but in general, it is about 10-50 μm, preferably, about 15-35 μm. About 18-30 μm thickness is particularly suitable for the welding of the present invention. The ribbon surface is covered with a very thin oxide layer of the alloy, and the surface roughness is relatively large. Accordingly, there is no need to provide the ribbon with insulating coatings.

Now, the welding of an amorphous wound core will be explained referring to the drawings.

FIG. 1 schematically shows the welding of an amorphous wound core according to the present invention. An amorphous wound core 1 is constituted by a ribbon 2 whose outer end is shown by the reference number 3. A pair of electrodes 4 connected to appropriate pulse generator (not shown) via wires 5 are placed on the outermost ribbon layer near the end 3. Since the amorphous ribbon has resilience, welding spots need not be located just at the ribbon end 3. Even if the welding spots are separated from the ribbon end 3 by a few millimeters, there is no problem. In some cases, more than one-centimeter separation is allowable, provided that the ribbon is sufficiently resilient. Accordingly, when it is mentioned herein that the electrodes are brought into contact with the surface of the outer end portion of the ribbon, the term "outer end portion" means a ribbon portion near the end 3 where welding can effectively keep the ribbon end from separating from the wound core body.

Figure 2:
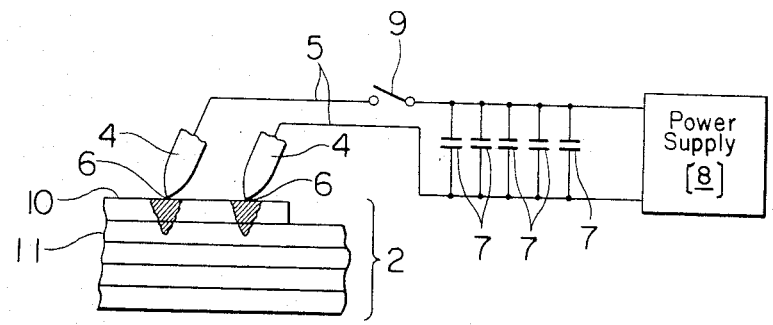
FIG. 2 is a detailed view showing the welding of an amorphous wound core according to the present invention.

Referring to FIG. 2, each electrode has a dull-pointed tip 6. The curvature of the electrode tip 6 may vary depending on how thick the ribbons to be welded are. In general, if the electrode tip is too sharp, a spark generated at the contact spot might melt away the top ribbon layer and possibly the underlying layers, causing serious damages to the wound core. On the other hand, if the electrode tip is too dull, the contact area of the electrode with the ribbon surface would be too large to provide good welding which does not affect the magnetic characteristics of the wound core. Further, the electrode tip may be flat as long as the tip surface is small enough to ensure the welding of minimum area and capable of firmly keeping the welded ribbons together.

As noted above, the welding area should be as small as possible as long as the welding is strong enough to firmly keep the welded ribbons together. The actual welding area is determined by taking into account the thickness of the amorphous ribbon. When the ribbon is as thick as about 10–50 μm, the welding area may be about 0.01–0.5 mm².

The electrodes 4 should not be pressed onto the ribbon surface strongly so as to avoid the deterioration of magnetic characteristics due to internal stress which might remain after the welding. As a matter of fact, the electrodes are pressed onto the ribbon surface to the extent that the outermost ribbon layer is brought into full contact with the underlying ribbon layer without substantially deformed. As a result, no significant internal stress remains in the welded ribbons.

Referring to FIG. 2 again, the electrodes 4 are connected to a pulse generator consisting of a plurality of capacitors 7 arranged in parallel and the DC power supply A switch 9 is provided on one of the wires 5. While both electrodes 4 are contacted with the outermost ribbon layer 10 with small pressure near the end 3 thereof, the switch 9 is closed, releasing an electric energy accumulated in the capacitors 7. Electric current flows as a pulse through the two electrodes 4 and the ribbon layer lying between them. Due to high contact resistance between each electrode 4 and the ribbon surface, heat is generated instantaneously at the contact spots, melting the ribbon material. Because the ribbon 4 is very thin, instantaneous heating with small energy is enough to melt the outermost ribbon layer 10 and the underlying layer 11. A couple of the underlying layers may be melted when relatively large energy is released from the capacitors 7. As long as welding areas are sufficiently small, that is allowable. It should be noted, however, that what is essential is to melt the outermost layer 10 and the layer 11 lying directly beneath it. This can be easily achieved by placing both electrodes on the same side of the ribbon.

One welding operation may be sufficient to firmly attach the outermost ribbon layer to the underlying layer. However, a couple of welding operations may be conducted to ensure that the outermost ribbon layer does not peel off, even if one or more pairs of welds are destroyed.

Since the resilience of the amorphous ribbon serves to retain the overall shape of the wound core whose outermost ribbon layer is welded, the inner end of the ribbon need not be welded. When an inner end of the ribbon is likely to be separated from the adjacent ribbon layer, it should be welded by the same method as mentioned above.

The present invention will be explained in further detail by means of the following Examples.

EXAMPLE 1

An amorphous alloy ribbon of 10 mm in width and 20 μm in average thickness made of an Co-base alloy was wound in a toroidal shape. The alloy composition was as follows:

| | |
|---|---|
| Co: | 70.5 atom % |
| Fe: | 4.5 atom % |
| Si: | 10 atom % |
| B: | 15 atom % |

The amorphous ribbon had a resistivity of 120 μΩcm.

The welding of the ribbon end portion to the underlying ribbon layer was carried out using a pair of dull-pointed electrodes made of pure Cu. The electrodes were brought into contact with the ribbon surface. The distance between the two electrodes was about 3 mm. The total energy accumulated in the capacitors 7 was varied from 0.05 to 175 Joules as shown in Table 1 below. At each energy level, 100 welding spots were provided by 50 welding operations under the same conditions. Each welding spot was measured with respect to welding strength in the direction substantially perpendicular to that of welding (substantially longitudinal direction of the wound ribbon). Welding rate was obtained by counting the welding spots whose welding strength was higher than 20 g, and calculating their percentage based on the total welding spots. The results are shown in Table 1.

TABLE 1

| Run | Total Energy (Joule) | Welding Rate (%) |
|---|---|---|
| 1 | 0.05 | 0 |
| 2 | 0.10 | 26 |
| 3 | 0.50 | 77 |
| 4 | 1.0 | 95 |
| 5 | 5.0 | 100 |
| 6 | 10.0 | 100 |
| 7 | 50.0 | 87 |
| 8 | 100 | 52 |
| 9 | 125 | 20 |
| 10 | 150 | 23 |
| 11 | 175 | 19 |

These experimental results show that good welding can be achieved at the total energy level of 0.5–100 Joules, particularly 1.0–50.0 Joules. It was observed that too high energy led to a low welding rate because the ribbon material was melted away at the welding spots.

Incidentally, because the resistivity of the amorphous alloy ribbon was 120 μΩcm and the distance between the two electrodes was 3 mm, it is evident that 90% of electric charge Q was released within $10^{-5}$ seconds.

EXAMPLE 2

The welded wound cores of Run Nos. 3–7 in Example 1 were measured with respect to magnetic characteristics, and comparison was made with a wound core of the same amorphous alloy ribbon whose outer end of the ribbon was fastened to the core with a non-magnetic wire instead of welding (control). Measurements were performed on 10 samples for each of Run Nos. 3–7 and Control. The results are shown in Table 2 in which numeral values are averaged ones.

TABLE 2

| | Magnetic Characteristics | | |
|---|---|---|---|
| Run | Coercivity (mOe) | Rectangularity (%) | Core Loss [2KG/20KHz] (mW/cm³) |
| 3 | 9.0 | 93 | 22 |
| 4 | 8.5 | 93 | 23 |
| 5 | 8.5 | 93 | 22 |
| 6 | 8.5 | 93 | 20 |
| 7 | 7.5 | 92 | 22 |
| Control | 8.0 | 93 | 22 |

This comparison clearly shows that the welding according to the present invention does not deteriorate magnetic characteristics of amorphous wound cores at all.

As mentioned above, the welding method of the present invention provides good welding having minimum welding area. Because the welding area is located only on the surface of the amorphous wound core and also is very small, the welding spot is rapidly cooled. In addition, since the welding is performed on the outer surface of the ribbon end portion without clamping the wound core from both outer and inner surfaces thereof, there is no internal stress remaining in the welded wound cores. Accordingly, the magnetic characteristics of the amorphous wound cores do not deteriorate at all by welding according to the method of the present invention. Further, since welding is carried out from one side (outside or inside) of the cores, it is extremely easy, making the production of welded amorphous wound cores less expensive. With a capacitor type pulse generator, optimum pulse conditions can be easily determined by varying the voltage applied to the capacitors.

What is claimed is:

1. A method for welding an end portion of a wound magnetic amorphous metal ribbon in order to produce a wound magnetic core comprising the steps of:

(a) bringing a pair of electrodes into contact with an outer surface of an outer end portion of said amorphous ribbon; and
   (b) supplying an electric pulse having an energy level of 0.5 to 100 joules between said pair of electrodes to instantaneously melt said outer end portion and an underlying ribbon layer for welding them together without causing deterioration in the magnetic characteristics of said wound core.

2. The method for welding said wound core according to claim 1, wherein each of said electrodes is a rod made of an electrically conductive metal.

3. The method for welding said wound core according to claim 1, wherein at least two cycles of the steps (a) and (b) are repeated.

4. The method for welding said end portion of the wound core according to claim 1, further comprising the steps of:

(c) bringing a pair of electrodes into contact with an inner surface of an inner end portion of said ribbon; and
   (d) supplying an electric pulse between said pair of electrodes to instantaneously melt said inner end portion and an overlying ribbon layer thereby welding them together.

* * * * *